A. F. GRAMBAUER.
DRIER.
APPLICATION FILED MAR. 27, 1914.
1,165,774.
Patented Dec. 28, 1915.
6 SHEETS—SHEET 5.
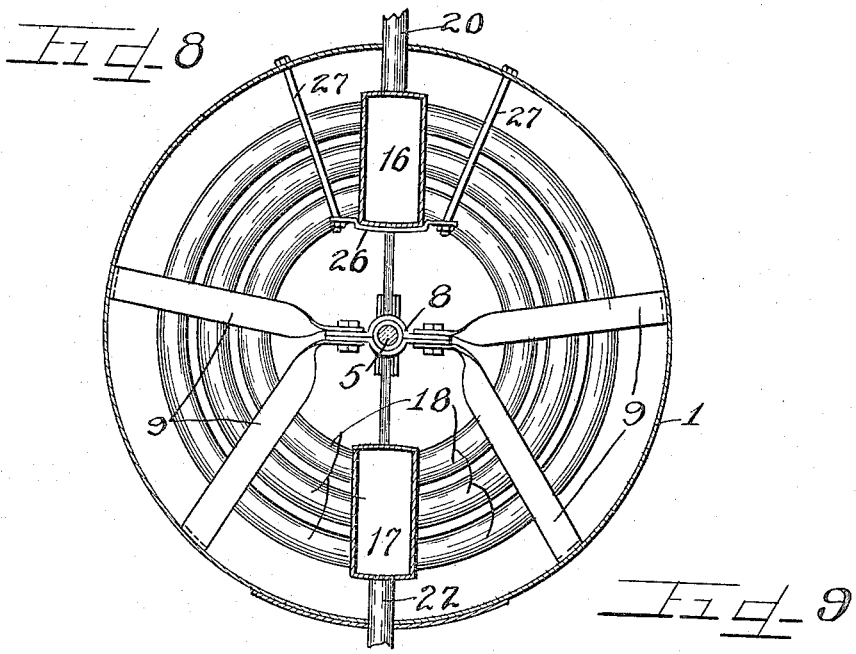
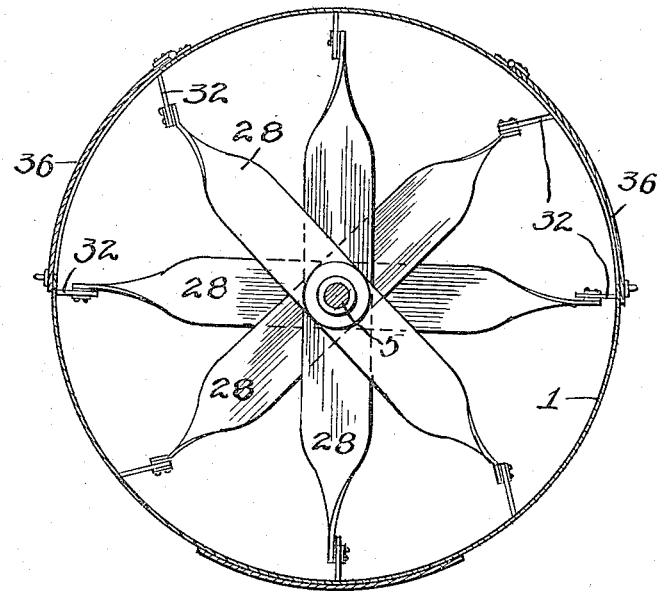

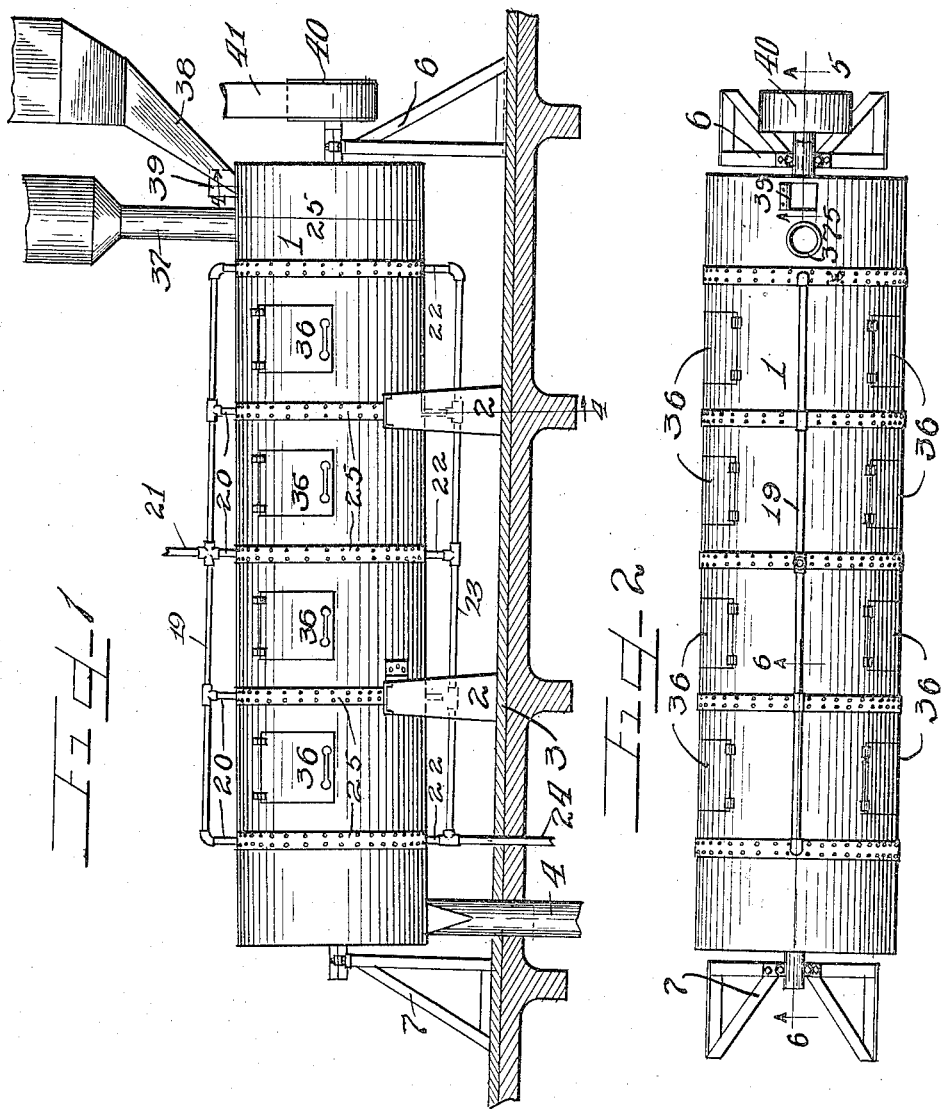

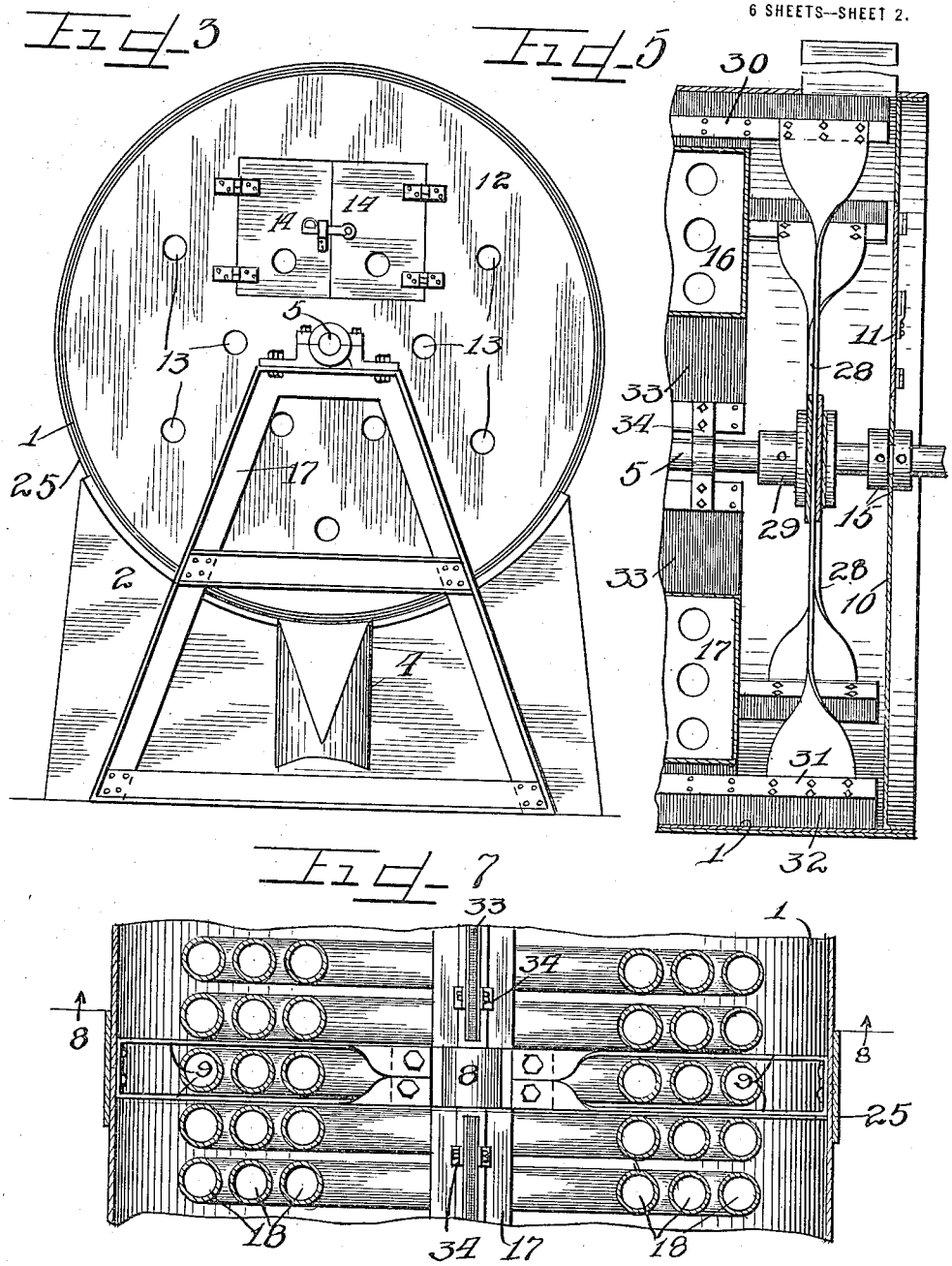

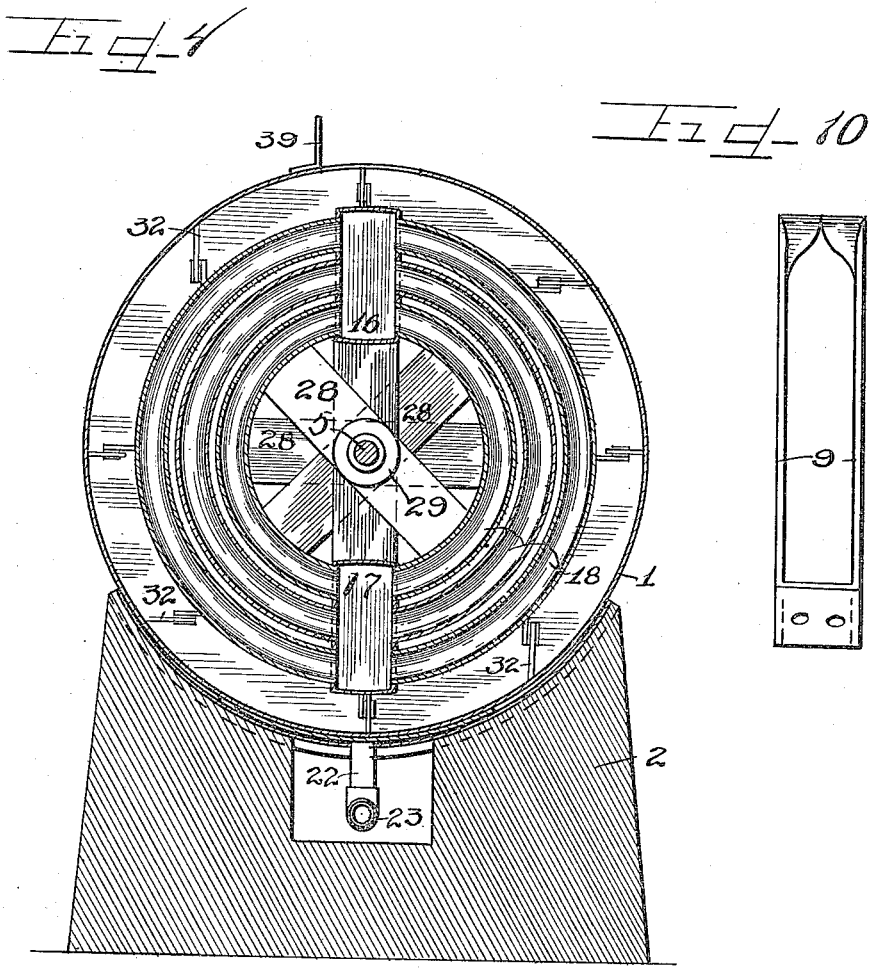
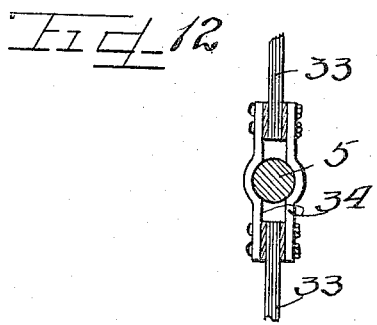
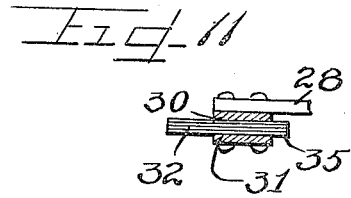

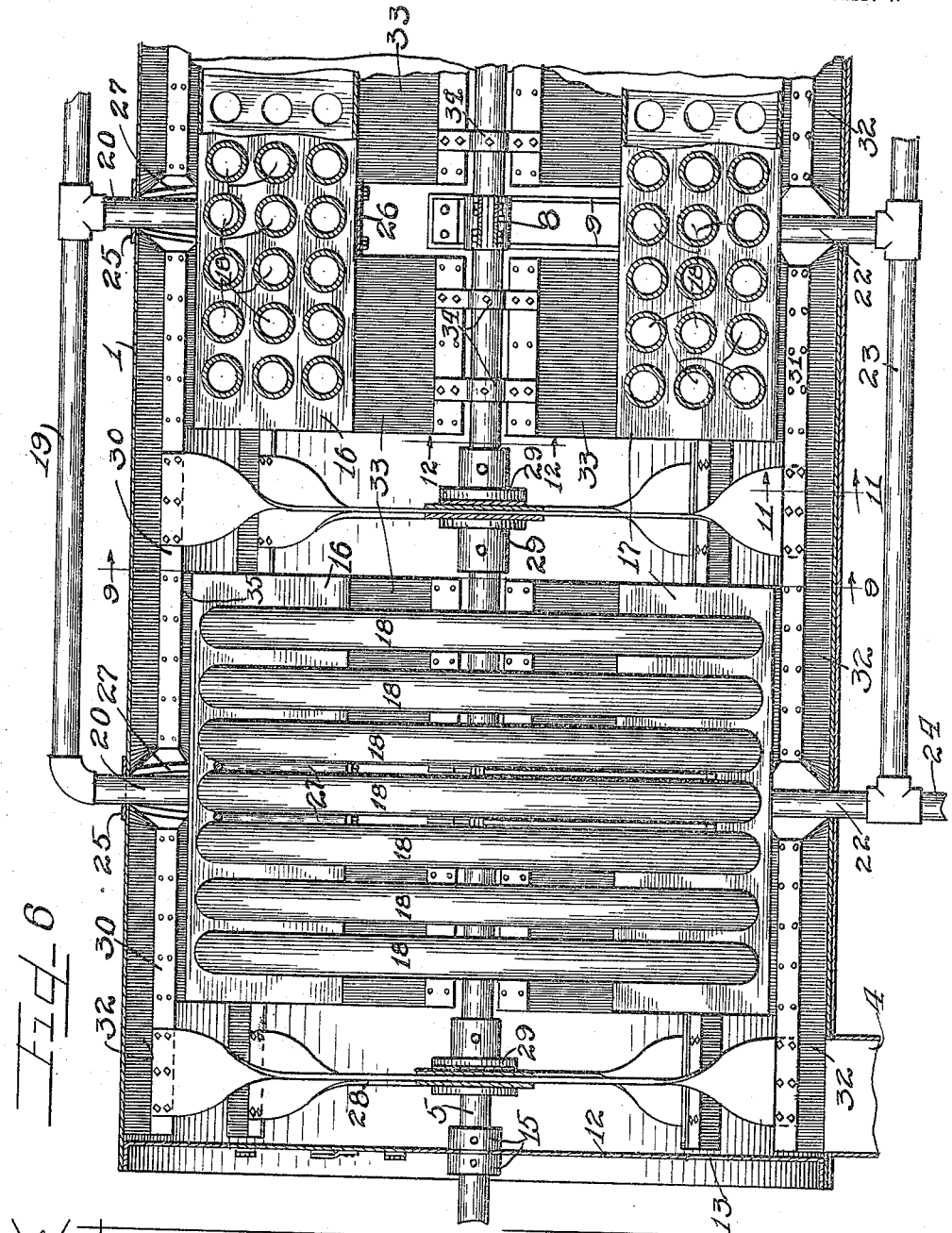

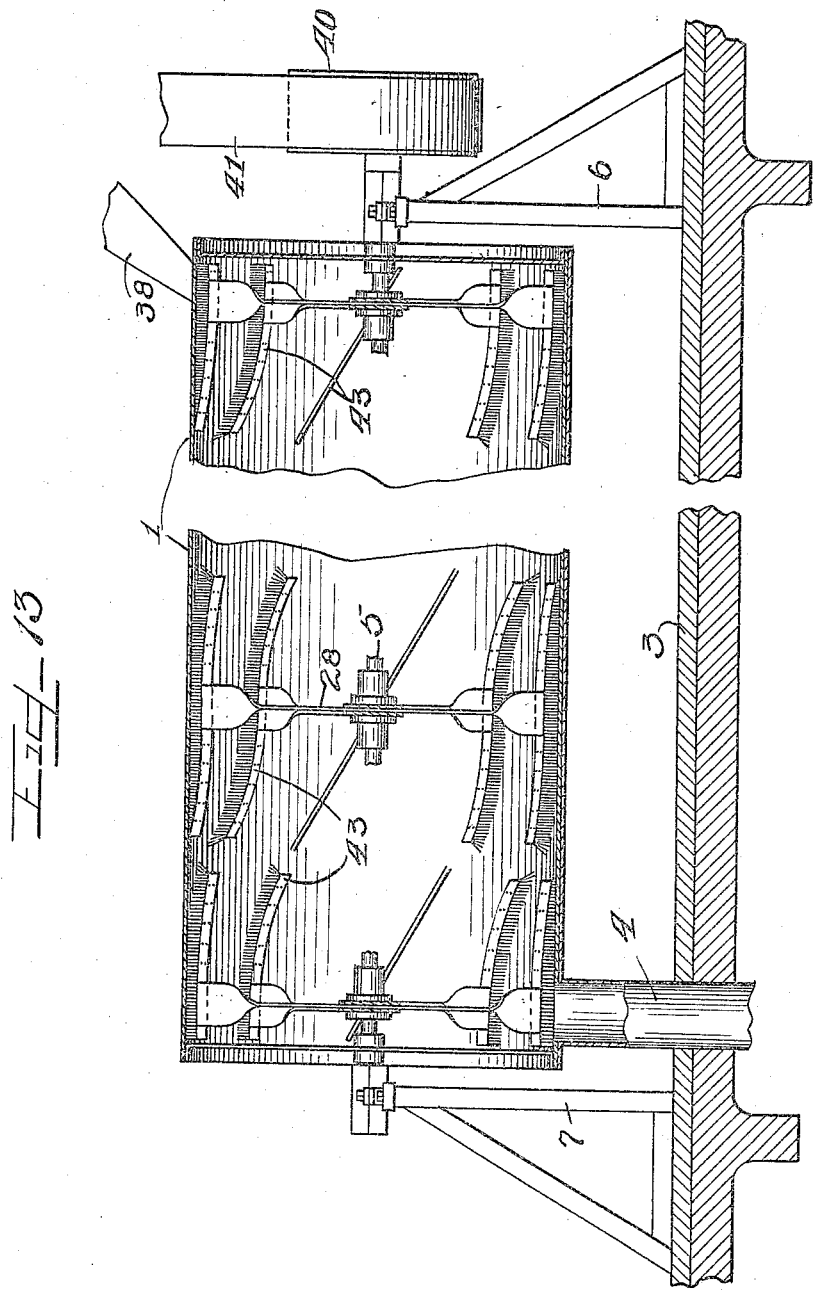

UNITED STATES PATENT OFFICE.

AUGUSTUS F. GRAMBAUER, OF CHICAGO, ILLINOIS.

DRIER.

1,165,774.      Specification of Letters Patent.      Patented Dec. 28, 1915.

Application filed March 27, 1914. Serial No. 827,560.

*To all whom it may concern:*

Be it known that I, AUGUSTUS F. GRAMBAUER, a citizen of the United States, and a resident of the city of Chicago, in the county of Cook and State of Illinois, have invented certain new and useful Improvements in Driers; and I do hereby declare that the following is a full, clear, and exact description of the same, reference being had to the accompanying drawings, and to the numerals of reference marked thereon, which form a part of this specification.

Most of the driers upon the market used for grain and other materials consist of long inclined drums, which are rotated by means of suitable gearing and heated internally or externally, and provided on the interior with vanes or abutments serving to advance the material through the drum. This type of drier is open to many objections, for the reason that, owing to its great weight, a heavy foundation and special bearings are required, as well as special gearing to rotate the same, and it has been found that considerable power, ranging from ten to twelve horsepower is necessary to drive the drier. Furthermore, where such driers are internally heated, complications are met with in the connections between the heating means within the drier and the supply line. As heretofore constructed, where such driers have been internally or externally heated by steam coils or steam jackets, condensation therein has been allowed to return by gravity through the inlet pipe, so that a large amount of the heat contained in the steam is thus returned without serving its purpose.

This invention relates to a drier in which the drum is stationary, as well as the heating elements contained within the drum, but in which rotating mechanisms are provided within the drum adapted to elevate and advance the material through the drum and distribute it over the drying elements, serving to thoroughly break up the material, and effecting a thorough drying out of the same.

It is an object of this invention to construct a device wherein rotating mechanism is contained within a stationary drum elevated at the forward end receiving the material to be passed therethrough, and in which heating elements are so disposed that the steam is introduced at one point and the condensation is drained at another point therefrom, so that the condensed steam is allowed to communicate a large amount of its heat to the material before leaving the drier.

It is also an object of this invention to construct a drier wherein relatively dry air is admitted at one end and is passed through the heated drier and withdrawn through a stack just prior to meeting the incoming cold material, thus obviating condensation of moisture contained in the air by contact with the cold entering material.

It is also an object of this invention to construct a device wherein an inclined stationary drum is provided containing a series of circular heating elements and with rotating means extending longitudinally through the drum acting to carry and sweep the material upwardly on the sides of the drum, allowing the same to fall through the drying elements to the bottom of the drum, and with brushes on said rotating means to sweep the drying elements clear of material collecting thereon.

It is also an object of this invention to provide an inclined stationary drier provided with rotating mechanisms therewithin mounted upon an axial shaft suitably supported on outside bearings at its ends, and intermediate its ends on a bearing within the drier and carrying longitudinal bars and brushes, sweeping the inner surface of the drum.

It is furthermore an object of this invention to construct a drier containing a series of internal heating elements comprising a series of upper longitudinally extending steam chambers and a series of lower condensation chambers, said chambers connected by coils of circularly bent pipes so that the steam may enter at the top and flow through the coils to condense and pass out of the main drum from said lower steam drum.

It is finally an object of this invention to construct a device capable of effectively performing its purpose and obviating a number of defects and objections found in other machines, and provided with means in the sides and ends for gaining access thereinto when desired.

The invention (in a preferred form) is illustrated in the drawings and hereinafter more fully described.

On the drawings: Figure 1 is a side elevation of a device embodying the principles of my invention. Fig. 2 is a top plan view thereof with parts omitted. Fig. 3 is a rear end elevation of the device. Fig. 4 is a section on line 4—4 of Fig. 1, with parts omitted. Fig. 5 is a fragmentary detail taken on line 5—5 of Fig. 2, with parts omitted. Fig. 6 is a fragmentary longitudinal section taken on line 6—6 of Fig. 2, with parts omitted and parts in elevation. Fig. 7 is a fragmentary horizontal section taken centrally through the drum, illustrating the inner bearing for the shaft. Fig. 8 is a section on line 8—8 of Fig. 7. Fig. 9 is a fragmentary view taken on line 9—9 of Fig. 6, with parts omitted and parts in elevation. Fig. 10 is a detail of one of the arms supporting the central internal bearing for the axial shaft. Fig. 11 is a fragmentary detail section taken on line 11—11 of Fig. 6. Fig. 12 is a fragmentary detail section taken on line 12—12 of Fig. 6. Fig. 13 is a longitudinal central vertical section with parts omitted of a modification in which the drum is not inclined.

As shown in the drawings: the drier consists of a shell or drum, preferably of steel, and mounted upon supports 2, in a slightly inclined position. For convenience of illustration, the supports 2, are shown as resting upon a floor 3, of a building and the outlet or exit passage 4, from the drier, is shown extending downwardly from the rear lower end of the drier through the floor to feed the dry material into convenient receptacles on the floor below.

Extending longitudinally through the drum 1, centrally thereof, is a shaft 5, which is journaled at its forward end upon an outer bearing 6, and at its rear end upon a similar outer bearing 7. A central bearing 8, for said shaft is provided within the drum, and a number of looped arms 9, are riveted on the interior of the shell 1, and project inwardly and are bolted to said bearing to support the same. The forward end of said drum is closed by means of a steel head 10, provided with doors 11, affording access therethrough, and similarly the rear of the drum is provided with a head 12, having a number of apertures 13, to admit air and is also constructed with doors 14. Collars 15, are secured on said shaft 5, where the shaft extends through the heads 10 and 12, respectively, said collars fitting closely to the heads of the drum and acting to prevent longitudinal movement of the shaft therein. The drum is heated throughout its entire length by means of heating elements disposed on the interior, each of said elements being provided with an independent inlet and outlet. Each of the heating elements is exactly similar in construction, and although in the present instance five are shown, the number is immaterial, and is practically determined by the length or size of the drum. Said heating elements consist of an upper steam chamber 16, and a lower chamber 17, said chambers being connected to one another by a series of curved pipes 18, and the lower chamber serving to collect the water of condensation. A manifold supply pipe 19, extends along the upper side of the drum on the exterior thereof, and communicates with the respective chambers 16, by branch pipes 20, the supply of steam entering the manifold from the pipe 21. Similarly outlet branch pipes 22, extend through the lower wall of the drum and communicate in the respective condensation chambers 17, and each of said pipes 22, leads into a common manifold 23, from which the water of condensation is drained away by a single pipe 24. The pipe 24, may preferably lead to a steam trap, to discharge the water of condensation from time to time, but inasmuch as practically any type of steam trap would suffice, the illustration and description thereof has been omitted for the sake of clearness. Reinforcing bands 25, extend around the exterior of the drum 1, at the points at which the respective inlet and outlet pipes 20 and 22, respectively, communicate through the drum. Each of the upper or steam chambers 16, is supported by means of a stirrup 26, which is hung from the upper wall of the drum 1, by means of rods 27. The pipes 18, extending between the chambers 16 and 17, serve to support said chambers 17, in position within the drum. Rigidly secured upon said rotatable shaft 5, at points intermediate the respective heating elements are groups of brush arms 28, rigidly clamped upon the shaft between collars 29. Each of said arms, at its end, is twisted through an angle of substantially ninety degrees, and secured thereon are clamping bars 30 and 31, between which are secured brushes 32, which sweep over the inner peripheral surface of the drum. Each set of said brushes is of a length to extend between the respective inlet pipes 20, or the outlet pipes 22, the latter of which are spaced the same distance apart as the former. As said shaft 5, is rotated the clamping bars and brushes sweep around the inner surface of the drum, elevating the grain or other material contained therein, and allowing the same to fall as the brushes sweep over the upper half of the drum, the material falling through and upon the heating elements. In order to prevent the material from collecting upon the upper surface of the condensation chambers 17, radial brushes 33, are provided, which are secured by means of clamps 34, upon said shaft 5, and are of a length equal to the respective chambers 16 and 17. For the purpose of preventing an undue collection of material upon the upper surface of the steam chambers 16, certain of said brushes 32, are slightly longer than the others, permitting the rear ends thereof, denoted by the reference numeral 35, and shown in Figs. 6 and 11, to project rearwardly of the clamping bars 30 and 31. When said brushes move across the upper portion of the drum, the short inwardly directed ends 35, sweep over the upper surface of said steam chambers 16, to clear the same of material collected thereon. As clearly shown in Fig. 9, certain of the brushes 32, are mounted at an angle with the ends of the arms 28, and others project straight out radially therefrom, so that some carry the material farther before dumping it back to the bottom of the drier.

For the purpose of affording access to the interior of the drum, a number of doors 36, are provided on each side of the drum at points between the reinforcing bands 25. A stack 37, is provided at the front end of the drum to allow the warm moist air to escape from the drum, and an inlet spout 38, leads from a suitable source of supply, to feed the material to be dried through an aperture in the top wall at the front end of the drum, adjacent an abutment 39.

The purpose of the abutment 39, is to prevent the material contained within the drier from being thrown out by centrifugal force, due to the rotation of the brushes therein. A pulley 40, is secured upon the forward end of the shaft 5, and may be driven by a belt 41, connected to any suitable source of power.

In the modification illustrated in Fig. 13, I have shown the drum mounted horizontally instead of inclined. Accordingly, in order that the material may be conveyed longitudinally therethrough, I use inclined or curved brushes 42, the axis of which is preferably of helical configuration, so that the material handled is brushed longitudinally as well as transversely thereby.

The operation is as follows: The shaft 5, is of course continually driven and the brushes mounted thereon and sweeping over practically the entire inner peripheral surface of the drum, serve to lift and break up and distribute the material introduced at the forward end of the drum, serving by such movement of the material, and owing to the inclination of the drum, to advance the material rearwardly, where it is finally allowed to discharge through the outlet spout 4. Of course, the interior of the drum is at a relatively high temperature, owing to the large heating surface afforded by the heating elements, and also to the fact that the steam is introduced into the elements at one point and the water of condensation drawn off at another. It is readily apparent that by separate inlets and outlets the greatest possible amount of heat is withdrawn from the water of condensation before it is discharged, thus lowering the temperature of the same considerably below the boiling point. The air enters the drum at the rear end through apertures 13, and passes through the drier, leaving at the front end through the stack 37, the increase in temperature thereof serving to create a natural draft sufficient to maintain the requisite flow of air for ordinary purposes, but, if desired, a mechanical draft may be used.

One objection to a large number of driers upon the market is the fact that the moisture laden air leaving the drier is allowed to come into contact with the entering material to be dried, oftentimes by passing out of the drier through the inlet for the material, and a great deal of the moisture contained in the air leaving is thus condensed upon the relatively cool entering material. In my invention, however, the moist air is drawn off through the stack without being allowed to come into contact with the cold entering material, and this objection is thereby obviated.

I am aware that various details of construction may be varied through a wide range without departing from the principles of this invention, and I therefore do not purpose limiting the patent granted otherwise than necessitated by the prior art.

I claim as my invention:

1. In a drier of the class described an inclined drum, a plurality of heating elements disposed therewithin, and a plurality of brushes rotating within said drum and sweeping over the inner periphery thereof acting to advance and break up a material introduced into the drum.

2. In a drier of the class described a stationary inclined drum, stationary heating elements contained therewithin, a shaft extending axially through said drum, arms projecting radially therefrom, longitudinally extending brushes secured on the end of said arms adapted to sweep over the inner periphery of said drum, an inlet passage for material to be dried at the forward end of said drum, and an outlet passage at the rear end thereof.

3. In a device of the class described a stationary drum, stationary heating elements contained therewithin, brushes rotating within said drum adapted to sweep against the entire inner surface thereof, and against certain of said heating elements, inlet and outlet passages for material at the forward and rear ends of said drum respectively, and inlet and outlet passages at the rear and forward ends of said drum respectively permitting air to be drawn through the drum and passed outwardly from the drum prior to contact with cold entering material at the forward end of the drum.

4. In a device of the class described a stationary inclined drum, a plurality of heating elements disposed concentrically therewithin, a rotatable shaft extending axially through said drum, an inlet passage for material to be dried at the forward end of said drum, an outlet passage for air at the forward end of said drum spaced rearwardly from said inlet passage, a discharge passage for the material at the rear end of the drum, and means secured on said shaft to sweep around said heating elements to mix and advance the material through said drum.

5. In a device of the class described a stationary inclined container, a plurality of independent stationary heating elements therein, independent inlet and outlet connections for each of said heating elements, mechanism moving within said container in the space between the heating elements and the walls of the container to advance and break up a material introduced thereinto, and means permitting a flow of air through said container, to dry the material.

6. In a device of the class described a drum, brushes rotating therewithin, a plurality of heating elements mounted within said drum comprising concentrically arranged coils of pipes, a chamber into which the upper ends of said pipes communicate, a condensation chamber into which the lower ends of said pipes communicate, an inlet to said drum for a material to be dried, and rotating mechanisms within the drum to advance and break up said material.

7. In a device of the class described an inclined drum, circular heating elements disposed therewithin, and brushes rotating within said drum between said heating elements and the walls of said drum to advance and break up a material contained within the drum.

8. In a device of the class described an inclined drum, a plurality of concentrically arranged heating elements disposed therewithin, said heating elements spaced apart in groups, an axial shaft extending through said drum, and a plurality of brushes mounted thereon to sweep around the inner walls of the drum.

9. In a drier of the class described a stationary inclined drum, a plurality of concentrically arranged heating elements contained therewithin and spaced in groups apart from one another, a shaft extending axially through said drum, arms projecting radially therefrom, longitudinally extending brushes secured on the ends of certain of said drums adapted to sweep over the inner periphery of said drum, and longitudinally extending brushes secured upon the ends of certain other of said arms to sweep over the inner periphery of said heating elements, said drum having an inlet passage for materials to be dried at the forward end of said drum, and an outlet passage at the rear end thereof.

10. In a device of the class described an inclined drum, an axially mounted rotatable shaft therein, a plurality of independent stationary heating elements within said drum, independent inlet and outlet connections for each of said heating elements, mechanism associated with said shaft moving within said container in the space between the heating elements and the walls of the drum to advance and break up material introduced into the drum, and means also associated with said shaft sweeping over the inner periphery of said heating elements, said drum constructed to permit a flow of air through said drum to dry the material.

In testimony whereof I have hereunto subscribed my name in the presence of two subscribing witnesses.

AUGUSTUS F. GRAMBAUER.

Witnesses:
CHARLES W. HILLS, Jr.,
FRANK K. HUDSON.

Copies of this patent may be obtained for five cents each, by addressing the "Commissioner of Patents, Washington, D. C."